(12) United States Patent
Paiss

(10) Patent No.: US 7,544,950 B2
(45) Date of Patent: Jun. 9, 2009

(54) MICROSCOPE WITH VACUUM OBJECTIVE

(75) Inventor: Idan Paiss, Tel-Aviv (IL)

(73) Assignee: Applied Materials, Israel, Ltd., Rehovot (IL)

( * ) Notice: Subject to any disclaimer, the term of this patent is extended or adjusted under 35 U.S.C. 154(b) by 116 days.

(21) Appl. No.: 11/554,527

(22) Filed: Oct. 30, 2006

(65) Prior Publication Data

US 2008/0099690 A1    May 1, 2008

(51) Int. Cl.
*G01J 1/04* (2006.01)
(52) U.S. Cl. ..................................................... 250/372
(58) Field of Classification Search .................. 250/372
See application file for complete search history.

(56) References Cited

U.S. PATENT DOCUMENTS

| | | | |
|---|---|---|---|
| 7,095,022 B2 * | 8/2006 | Nakasuji et al. ............. | 250/310 |
| 2005/0110987 A1 * | 5/2005 | Furman et al. ............ | 356/237.4 |
| 2005/0205781 A1 * | 9/2005 | Kimba ........................ | 250/311 |
| 2006/0060781 A1 * | 3/2006 | Watanabe et al. ............ | 250/310 |
| 2006/0176580 A1 * | 8/2006 | Kirkham ...................... | 359/738 |
| 2006/0219909 A1 * | 10/2006 | Hatakeyama et al. ........ | 250/310 |
| 2007/0040118 A1 * | 2/2007 | Cheng et al. ................. | 250/310 |

* cited by examiner

*Primary Examiner*—David P Porta
*Assistant Examiner*—Marcus H Taningco
(74) *Attorney, Agent, or Firm*—Tarek N. Fahmi

(57) ABSTRACT

A microscope for inspecting a surface in an evacuated volume, including an optical objective assembly which is located in the evacuated volume in proximity to the surface. The assembly is arranged to collect and convey radiation from the surface while focusing the radiation so as to form an image of the surface. The microscope further includes a sensor, located in a space outside the evacuated volume, which is arranged to receive the radiation conveyed from the optical objective assembly so as to generate a signal corresponding to the image.

18 Claims, 2 Drawing Sheets

MICROSCOPE WITH VACUUM OBJECTIVE

FIELD OF THE INVENTION

The present invention relates generally to surface inspection, and particularly to inspection of surfaces that are in a vacuum.

BACKGROUND OF THE INVENTION

In a wafer fabrication facility, virtually all of the stages involved in producing a final product are performed on a semiconducting wafer in an evacuated or low pressure chamber. Typically, during and/or after at least some of the stages, the surface of the wafer is inspected. The inspections verify that the wafer is correctly aligned, that expected changes on the surface of the wafer have in fact occurred, and that no unexpected changes have also occurred. The inspections are advantageously performed while the wafer remains in its chamber, and typically so that the chamber remains in substantially the same evacuated or low pressure state used for implementing a stage prior to inspection.

Methods for inspecting semiconducting wafer surfaces under evacuated or low pressure conditions are known in the art. For example, Serenity Technologies Inc., of Beaverton, Ore., produce an OPTIVAC™ viewer that is stated to be an entire optical microscope, including a Charged Couple Device (CCD), inside an ultra high vacuum environment. However, the inclusion of electronic parts inside a vacuum chamber is problematic due to space issues and possible contamination of the interior clean vacuum environment.

Notwithstanding the above, an improvement to inspection methods is desirable.

SUMMARY OF THE INVENTION

In an embodiment of the present invention, a microscope, comprising an optical objective assembly and an image sensor, is used for inspecting the surface of an object. The object, typically a semiconducting wafer, is located in an evacuated volume of an object inspection chamber. The optical objective assembly comprises a microscope objective, typically an industry-standard microscope objective. The optical objective assembly is located at least partially in the evacuated volume, and the image sensor is located outside the evacuated volume, typically in a non-evacuated space outside the inspection chamber such as the ambient air.

The optical objective assembly collects radiation from a region on the surface and, typically, focuses the radiation to a primary image, usually formed at infinity. In this case the assembly conveys the radiation to the sensor via sensor optics. The sensor optics focus the primary image to a secondary image on the image sensor, and typically comprise a tube lens and coupling elements. Alternatively, the optical objective assembly may focus the primary image directly onto the image sensor. The image sensor generates a signal corresponding to the image formed on the sensor. Locating the objective assembly at least partially within the evacuated volume allows an operator of the microscope more freedom to effectively position the microscope objective relative to the surface being inspected and improves image quality, compared to microscopes which do not have an optical objective assembly located at least partially in the evacuated volume.

In one embodiment of the present invention, the objective assembly comprises a substantially plane transparent window which is inset into a wall of the chamber. The microscope objective is completely located in the evacuated volume, collects radiation from the region on the object surface, and transfers the radiation to the image sensor via the window. The radiation from the objective is approximately parallel to an axis of the microscope, so that placing a window after the objective and before the imaging optics leads to virtually no degradation of the image formed on the sensor.

In an alternative embodiment of the present invention, the objective assembly comprises a relay lens train. The relay lens train is inset into the cover wall of the inspection chamber. The relay lens train receives radiation from the region, and forms a real "relayed" intermediate image of the region in a location outside the chamber. The relay lens train is typically configured to have a magnification of approximately one. The microscope objective is positioned outside the chamber, so as to collect radiation from the relayed image.

The objective transfers the collected radiation to the image sensor (also outside the chamber), upon which is focused the image of the region, according to one of the methods described above. Insetting a relay lens train into the wall of the inspection chamber allows both the objective and the image sensor to be located outside the chamber, thus permitting easy manipulation of these elements by the microscope operator, while allowing the operator freedom to effectively position the objective relative to the surface being inspected. In addition, having the objective outside the chamber allows the microscope operator to use a turret arrangement comprising multiple objectives having different magnifications, fields of view, and/or resolutions. The relay lens train is typically configured to support the magnifications, fields of view, and resolutions of the multiple objectives.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Figure 1:
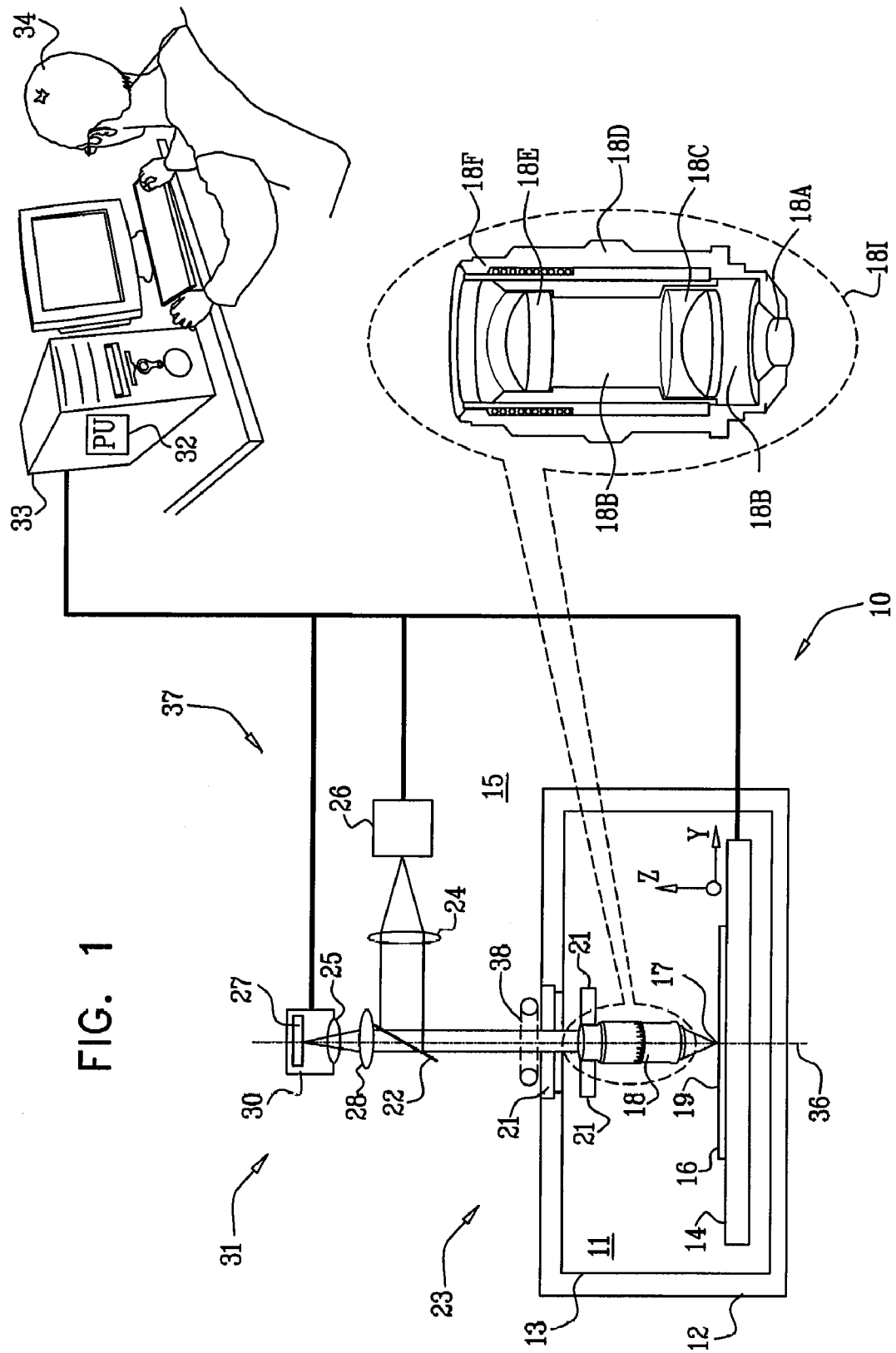
FIG. 1 is a schematic diagram of a microscope, according to an embodiment of the present invention.

Reference is now made to FIG. 1, which is a schematic diagram of a microscope 10, according to an embodiment of the present invention. An object 16, herein assumed by way of example to comprise a semiconducting wafer, is mounted on a translation stage 14 for inspection by the microscope. A processing unit (PU) 32, typically incorporated in a workstation 33, controls the operations of microscope 10, and an operator 34 uses the workstation to operate the microscope. In the following description, wafer 16 is assumed to be positioned on the translation stage so that a surface 19 of the wafer is substantially horizontal, and so that elements of microscope 10, described in detail below, are above the surface. However, it will be understood that in the instant application orientation terms such as "horizontal" and "above" are to clarify the description of microscope 10 and its operation, and that the microscope and wafer may be positioned in orientations other than that specifically referred to herein. Surface 19 is assumed to contain an x-y plane and to define a z-axis normal to the surface.

Wafer 16 is located in an internal volume 11 of an inspection chamber 12, the chamber having a chamber cover wall 13. In order to effect operations on the wafer, the internal volume of the chamber is sealed from a space 15, typically ambient air, external to the chamber. The chamber is configured so that volume 11 may be evacuated with a vacuum pump. Volume 11 may also have gases introduced into, and removed from, the volume in a controlled manner. For clarity, connections to chamber 12 for producing a vacuum in the internal volume, and/or for introduction or removal of gases from the internal volume, are not shown in FIG. 1. Hereinbelow, unless otherwise stated, volume 11 is assumed to be evacuated.

Microscope 10 comprises, as part of an optical objective assembly 23, a microscope objective 18 which is typically an industry-standard microscope objective. Typically, objective 18 is vacuum compatible, i.e., the objective does not introduce contamination into chamber 12, and is sufficiently mechanically stable to as to continue to function under frequent evacuations and ventings of the chamber. As is well known in the art, there are a large number of industry-standard microscope objectives available, the objectives being selected according to parameters such as required numerical aperture, working distance, working wavelength or range of wavelengths, flatness of field, extent of correction for aberrations, and resolution. In one embodiment, objective 18 may be an Olympus UMPLFL50x, produced by Olympus America Inc., Melville, N.Y. However, any other suitable objective, typically having a standard short working distance, may be used. In some embodiments of the present invention, objective 18 may comprise an at least partially custom-made objective, or alternatively, may comprise an adapted industry-standard objective.

Embodiments of the present invention enable objectives which are not available with long working distances to be easily incorporated into microscope 10. Such objectives include deep ultra-violet (DUV) objectives, for example the Leica 150x/0.90/248 DUV objective, produced by Leica Microsystems GmbH, of Wetzlar, Germany.

An inset 18I in FIG. 1 illustrates a cross-section of objective 18 schematically. Objective 18 comprises a front lens 18A, typically one or more internal lenses 18C, and a rear lens 18E. The lenses are separated by one or more spaces 18B. The lenses of the objective are retained in an objective housing 18D, which typically terminates close to rear lens 18E in standard threads 18F which are used to mount the objective. Those having ordinary skill in the art will be able to adapt the following description, which assumes that objective 18 is configured as shown in inset 18I, to objectives having configurations other than that shown in inset 18I, mutatis mutandis.

Industry-standard objectives such as objective 18 are typically configured to operate in ambient air pressure, and as illustrated in the inset of FIG. 1, typically comprise a multiplicity of lenses, at least some of which may have air spaces between them. In embodiments of the present invention wherein objective 18 is such an industry-standard objective, operator 34 may verify, without undue experimentation, that the unmodified objective functions satisfactorily in the evacuated and/or gas-filled conditions of chamber 12 described above. In some embodiments, the operator may adapt an industry-standard lens, also without undue experimentation, to function satisfactorily in chamber 12.

For example, referring for clarity to inset 18I, such adaptations may comprise operator 34 providing in objective housing 18D one or more small holes to spaces 18B between the lenses, and using cement for the lenses that is vacuum compatible regarding outgassing. The holes facilitate the transfer of gases between the spaces and volume 11, so that there is no undue pressure on elements of the objective. Alternatively or additionally, operator 34 may adapt objective 18 by having the external lenses of the objective, i.e., front lens 18A and rear lens 18E, sealed in place with vacuum-compatible cement, so that spaces within the objective remain air-filled and are sealed from volume 11.

Objective 18 is removably mounted, by standard threads 18F, in an objective mount 21. Mount 21 is fixedly positioned in volume 11, typically by being attached to wall 13. In some embodiments, mount 21 comprises a translation stage that allows the objective to be moved when it is retained in the mount. Objective 18 collects radiation from a region 17 of surface 19, and is configured in some embodiments, as described below, so as to form a primary image of the region. The characteristics and position of the primary image formed by the objective is a function of the objective parameters. Typically, the primary image is formed at infinity. Alternatively, the primary image may be formed at a position other than infinity.

Typically, microscope 10 also incorporates surface illumination optics. By way of example, microscope 10 comprises a partially transmitting beamsplitter 22, an illumination source 26, and a focusing lens 24, which are configured to transfer radiation from source 26 to surface 19 via objective 18. This type of illumination may be configured to provide "bright field" illumination on surface 19, i.e., illumination that is substantially normal to surface 19, or "dark field" illumination, i.e., illumination that is non-normal to the surface. Alternatively or additionally, illumination on surface 19 may be provided by other radiation sources mounted external to chamber 12, the other radiation sources not necessarily transferring radiation onto surface 19 via objective 18. Such other radiation sources typically provide dark field illumination. In some embodiments a ring illuminator 38 provides dark field illumination, and may be located in region 15, above a window 20 described below. The operating wavelength, or range of wavelengths, of the surface illumination optics typically comprises wavelengths in the visible region, UV, or DUV, although other wavelengths may also be used. The operating wavelength may be selected by operator 34. Operator 34 also arranges that elements of microscope 10, such as objective 18 described above and other elements described below, function optimally at the operating wavelength. Except where otherwise indicated, the following description assumes that the surface illumination is provided from source 26 via beamsplitter 22.

Optical objective assembly 23 also comprises a window 20 which is inset into wall 13. Window 20 is a parallel-sided window which is transparent to the operating wavelengths of microscope 10, and which is typically anti-reflection coated at the operating wavelength, so that there is little or no reflection at these wavelengths. Operator 34 selects the thickness of the window to be sufficient to withstand any pressure difference between internal volume 11 and external space 15, while minimally distorting images generated by radiation traversing the window. A typical thickness for window 20 is in the range of approximately 1 mm to approximately 3 mm. The window is inset into wall 13, usually using O-rings, so that a seal between the window and the wall is gas-tight.

Window 20 transfers the surface illumination radiation from beamsplitter 22 to objective 18. Window 20 also transfers the radiation collected from region 17 by the objective to the beamsplitter, which transmits the collected radiation to imaging optics 31. Imaging optics 31 comprise a focusing lens 28, typically a tube lens, and a camera 30, both of which are selected by operator 34 to function at the operating wavelengths. Camera 30, comprising an image sensor 27 and one or more coupling elements 25, forms a real secondary image of region 17 on the sensor. The sensor is typically an imaging array such as an array of charged coupled devices. The camera forms the secondary image by using the primary image from the objective as an object.

In an alternative embodiment of the present invention, objective 18 is configured to form its image directly onto image sensor 27. In this embodiment, lens 28 and coupling elements 25 may be absent.

As illustrated schematically by lines 37, PU 32 controls the operation of camera 30, and receives signals from the camera in response to the image formed in the camera. In addition, PU 32 controls the operation of source 26. PU 32 also controls the positioning of region 17 relative to microscope 10, by operation of stage 14. Elements of microscope 10, including objective 18, beamsplitter 22, lens 28, and camera 30, are arranged to have a common optic axis 36, which also intersects region 17, parallel to the z-axis.

Typically, in operating microscope 10, operator 34 introduces wafer 16 via a loading chamber, not shown in FIG. 1, into chamber 12, which has previously been evacuated. The operator adjusts stage 14 and/or mount 21 so that objective 18 aligns with, and is at the correct working distance from, a specific region 17 that the operator is inspecting. The operator performs the adjustments using the image generated by the camera.

The configuration of microscope 10 provides a number of significant advantages over prior art microscopes:

There is no separating element between surface 19 and the external surface of front lens 18A. Thus the working distance, i.e., the distance between the two surfaces, may be extremely small. Such a small distance allows a higher usable magnification, as well as a higher numerical aperture (NA) and an increase in resolution. In addition, the lack of a separating element means that dark field illumination is relatively easy to configure. For example, unlike systems having a separating element between the surfaces, in embodiments of the present invention there are no interfering reflections from window 20 or its mount, nor from contamination particles on the window. Furthermore, since DUV objectives cannot be manufactured with a window correction and/or a long working distance, the lack of a separating element between the two surfaces allows such objectives to be used. Also, using UV illumination increases the scattered light from small particles, as well as providing improved resolution for the particles.

Window 20 is located in a region of the microscope, after the external surface of objective rear lens 18E, where the thickness required by the window (because of the difference in pressure between internal volume 11 and space 15) leads to minimal reduction in optical performance, so that the image formed on image sensor 27 is substantially undistorted. Positioning window 20 in this region leads to an improvement of approximately two orders of magnitude in image distortion compared to the image distortion caused by positioning a window of the same thickness between objective 18 and surface 19.

Figure 2:
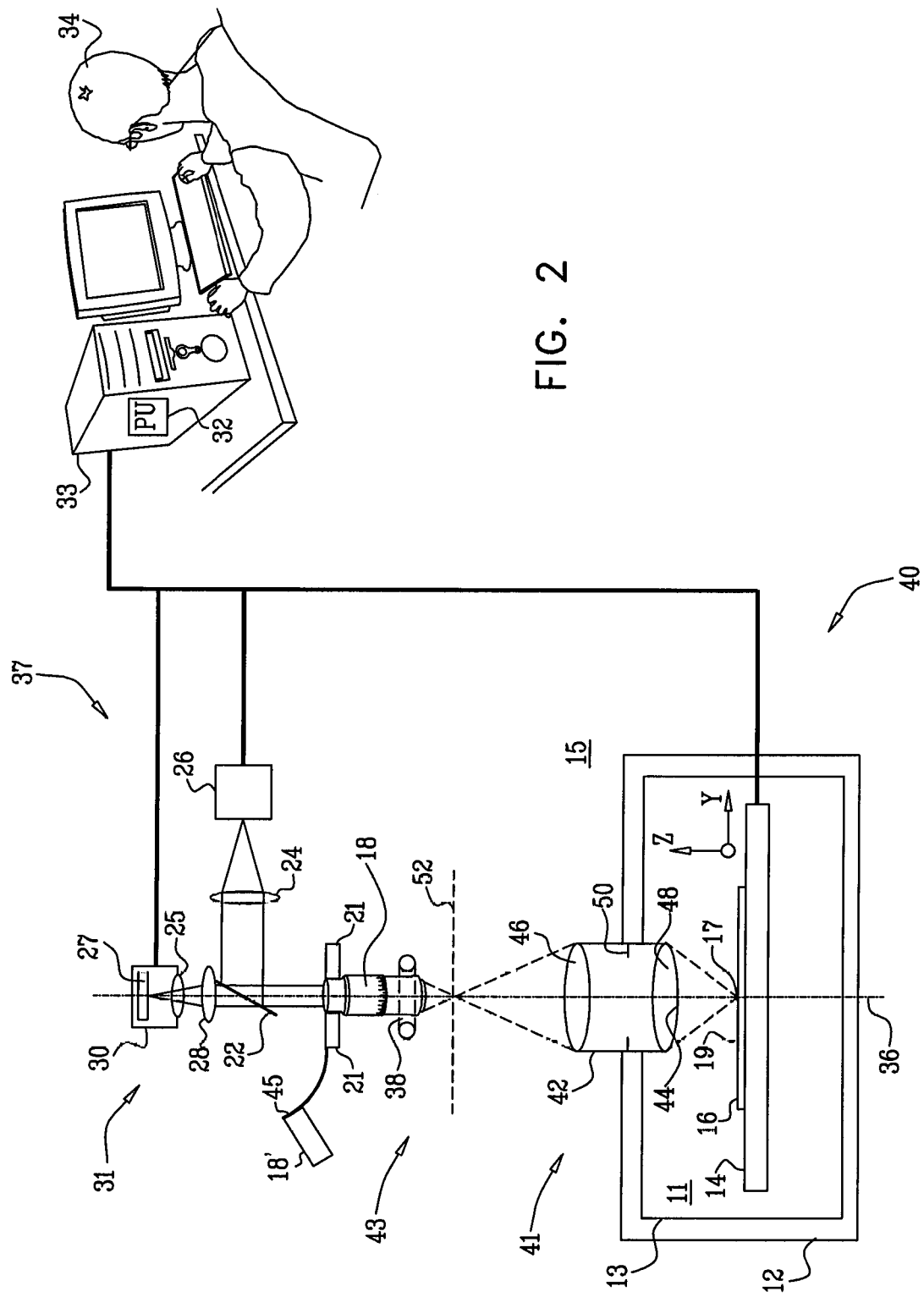
FIG. 2 is a schematic diagram of an alternative microscope, according to an embodiment of the present invention.

FIG. 2 is a schematic diagram of a microscope 40, according to an alternative embodiment of the present invention. Apart from the differences described below, the operation of microscope 40 is generally similar to that of microscope 10 (FIG. 1), such that elements indicated by the same reference numerals in both microscopes 40 and 10 are generally identical in construction and in operation. Instead of optical objective assembly 23, microscope 40 comprises an optical objective assembly 43. Assembly 43 comprises objective 18 and a relay lens train 41 which is inset into wall 13. Lens train 41 comprises a front lens 48 and a rear lens 46, retained by a relay housing 42. Train 41 may comprise an iris 50, as well as one or more other lenses between lenses 46 and 48. For clarity the one or more other lenses are not shown in FIG. 2. Lens train 41 is configured to form a real "relayed" image of region 17 at a plane 52 above the relay lens train. The relay lens train may be configured so that the size of the image at plane 52 is substantially equal to the size of region 17 that is being imaged, or to generate a dilated, i.e., a magnified or a de-magnified, image. Typical dilations of train 41 are in a range from approximately 1:0.5 to approximately 1:5.

In operation, objective 18 is positioned to focus the image formed at plane 52. The remaining elements of microscope 40, including the illumination source or sources, are generally positioned with respect to objective 18 substantially as described above for microscope 10. Thus, bright field or dark field illumination may be provided at region 17 by source 26. Alternatively, dark field illumination may be provided by ring illuminator 38, which may advantageously be positioned surrounding objective 18, as shown in FIG. 2. Other methods for conveniently providing dark field illumination will be apparent to those of ordinary skill in the art. As one example, one or more sources which may comprise reflectors and/or shields, or a ring source generally similar to illuminator 38, may be positioned between objective 18 and lens 46 so that, taking regard of the numerical aperture of the objective, no interfering radiation enters the objective. As a second example, an additional window (not shown in FIG. 2) may be provided in a suitable position in wall 13, so that radiation via the window gives dark field illumination at surface 19.

As described above for microscope 10, in microscope 40 objective 18 may be configured to form its image at infinity or at a location different from infinity. Alternatively, as also described with respect to microscope 10, objective 18 may be configured to form its image directly on sensor 27.

In one embodiment of the present invention, the following distances may be used in microscope 40. A working distance from an external surface 44 of lens 48 to surface 19 is typically between approximately 2 mm and 4 mm. A relay distance between surface 19 and plane 52 is typically greater than about 100 mm.

The configuration of microscope 40 provides the relayed image of region 17 at surface 52, so that with the relay distance given above there is easy access to the image by objective 18, and the relayed image is at a convenient height above chamber 12. By relaying the image to surface 52, operator 34 may easily check that desired illumination of region 17 is actually achieved. Furthermore, the convenient height and easy access of the relayed image allow objective 18 to be mounted with other objectives, for example an objective 18', in a standard microscope turret 45, thus providing the operator of microscope 40 with a range of magnifications and resolutions. It will be understood that the numerical aperture, field of view and configuration of the relay lens train 41 should be selected with reference to parameters of objective 18 and other objectives such as objective 18' that may be used, so as not to degrade the relayed image quality, or the quality of the image formed on sensor 27.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A microscope for inspecting a surface in an evacuated volume, comprising:
   an optical objective assembly located in proximity to the surface and arranged to collect and convey radiation from the surface while focusing the radiation so as to form an image of the surface, the optical objective assembly including an objective which is completely located within a space outside the evacuated volume and a relay lens train which is configured to separate the evacuated volume from the space, to transfer the radiation therebetween, and to form an intermediate image of a region of the surface; and
   a sensor, located in the space outside the evacuated volume and arranged to receive the radiation conveyed from the optical objective assembly so as to generate a signal corresponding to the image.

2. The microscope according to claim 1, wherein the objective and the sensor are configured to operate at wavelengths less than or equal to 300 nm.

3. The microscope according to claim 1, and further comprising an illumination source located in the space outside the evacuated volume and configured to provide illumination to the surface via the optical objective assembly.

4. The microscope according to claim 1, wherein a ratio of the size of the region and of the intermediate image of the region is in a range from approximately 1:0.5 to approximately 1:5.

5. The microscope according to claim 1, wherein the intermediate image is a real image located in the space outside the evacuated volume.

6. The microscope according to claim 1, wherein the objective comprises a multiplicity of separate objectives having respective different optical characteristics, each separate objective being positionable so as to inspect the surface, and wherein the relay lens train is configured in response to the different optical characteristics so that the image of the surface is not degraded.

7. A microscope for inspecting a surface in an evacuated volume, comprising:
   an optical objective assembly located in the evacuated volume in proximity to the surface and arranged to collect and convey radiation from the surface while focusing the radiation so as to form an image of the surface,
   a sensor, located in the space outside the evacuated volume and arranged to receive the radiation conveyed from the optical objective assembly so as to generate a signal corresponding to the image; and
   one or more optical elements located between the optical objective assembly and the sensor,
   wherein the image comprises a primary image, and wherein the one or more optical elements are configured to form a secondary image, from the primary image, on the sensor.

8. The microscope according to claim 7, wherein the objective assembly and the sensor are configured to operate at wavelengths less than or equal to 300 nm.

9. The microscope according to claim 7, further comprising an illumination source located in the space outside the evacuated volume and configured to provide illumination to the surface via the optical objective assembly.

10. A method for inspecting a surface in an evacuated volume, comprising:
    locating an optical objective assembly in proximity to the surface so as to collect and convey radiation from the surface while focusing the radiation to form an image of the surface, wherein the optical objective assembly includes an objective and a relay lens train, and locating the optical objective assembly includes completely locating the objective within a space outside the evacuated volume and arranging the relay lens train to separate the evacuated volume from the space, to transfer the radiation therebetween, and to form an intermediate image of a region of the surface; and
    locating a sensor in a space outside the evacuated volume in order to receive the radiation conveyed from the optical objective assembly, so as to generate a signal corresponding to the image.

11. The method according to claim 10, wherein the objective and the sensor are configured to operate at wavelengths less than or equal to 300 nm.

12. The method according to claim 10, further comprising locating an illumination source in the space outside the evacuated volume so as to provide illumination to the surface via the optical objective assembly.

13. The method according to claim 10, wherein a ratio of the size of the region and of the intermediate image of the region is in a range from approximately 1:0.5 to approximately 1:5.

14. The method according to claim 10, wherein the intermediate image is a real image located in the space outside the evacuated volume.

15. The method according to claim 10, wherein the objective comprises a multiplicity of separate objectives having respective different optical characteristics, each separate objective being positionable so as to inspect the surface, and wherein the relay lens train is configured in response to the different optical characteristics so that the image of the surface is not degraded.

16. A method for inspecting a surface in an evacuated volume, comprising:
    locating an optical objective assembly in the evacuated volume in proximity to the surface so as to collect and convey radiation from the surface while focusing the radiation to form an image of the surface; and
    locating a sensor in a space outside the evacuated volume in order to receive the radiation conveyed from the optical objective assembly, so as to generate a signal corresponding to the image; and
    locating one or more optical elements between the optical objective assembly and the sensor, wherein the image comprises a primary image, and wherein the one or more optical elements are configured to form a secondary image, from the primary image, on the sensor.

17. The method according to claim 16, wherein the objective assembly and the sensor are configured to operate at wavelengths less than or equal to 300 nm.

18. The method according to claim 16, further comprising locating an illumination source in the space outside the evacuated volume so as to provide illumination to the surface via the optical objective assembly.

* * * * *